United States Patent
Bergius et al.

(10) Patent No.: US 10,390,224 B2
(45) Date of Patent: Aug. 20, 2019

(54) EXCEPTION HANDLING IN CELLULAR AUTHENTICATION

(71) Applicant: Nokia Technologies Oy, Espoo (FI)

(72) Inventors: Hannu Bergius, Kangasala (FI); Silke Holtmanns, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 109 days.

(21) Appl. No.: 15/311,054

(22) PCT Filed: May 20, 2014

(86) PCT No.: PCT/FI2014/050381
§ 371 (c)(1),
(2) Date: Nov. 14, 2016

(87) PCT Pub. No.: WO2015/177396
PCT Pub. Date: Nov. 26, 2015

(65) Prior Publication Data
US 2017/0118643 A1 Apr. 27, 2017

(51) Int. Cl.
*H04W 12/06* (2009.01)
*H04L 9/12* (2006.01)
(Continued)

(52) U.S. Cl.
CPC ........ *H04W 12/06* (2013.01); *G06Q 20/3576* (2013.01); *H04L 9/12* (2013.01);
(Continued)

(58) Field of Classification Search
CPC ....... H04W 4/00; H04W 12/04; H04W 24/04; H04W 12/06; G06F 1/24; H04L 9/14;
(Continued)

(56) References Cited

U.S. PATENT DOCUMENTS 7,281,134 B2 * 10/2007 Schmit .................. H04L 9/3271
713/151
8,462,742 B2 6/2013 Song et al.
(Continued)

FOREIGN PATENT DOCUMENTS

CN 1426185 A 6/2003
CN 101080886 A 11/2007
(Continued)

OTHER PUBLICATIONS

"3rd Generation Partnership Project; Technical Specification Group Services and System Aspects; 3GPP System Architecture Evolution (SAE); Security architecture (Release 12)", 3GPP TS 33.401, V12.10.0, Dec. 2013, pp. 1-121.
(Continued)

*Primary Examiner* — Thanhnga B Truong
(74) *Attorney, Agent, or Firm* — Harrington & Smith

(57) ABSTRACT

A cellular terminal transmits a request that requires authentication procedure triggering to a cellular network and responsively receives from the cellular network an authentication request message with an indication of a selected cryptographic algorithm from a group of a plurality of cryptographic algorithms. The cellular terminal attempts to decode the authentication request message to a decoded authentication request according to the selected cryptographic algorithm and based on a shared secret known by the cellular terminal and a network operator of the cellular terminal. The cellular terminal produces a determination whether the attempt was successful and the cellular terminal supports the selected cryptographic algorithm in authenticating to the cellular network; and in case the determination is positive, based on the decoded authentication request, the shared secret and the selected cryptographic algorithm, produces and encrypts an authentication response message and transmits the authentication response message to the
(Continued)

cellular network; and in case the determination is not positive, produces and sends to the cellular network a failure report.

18 Claims, 3 Drawing Sheets

(51) Int. Cl.
| | |
|---|---|
| *H04L 9/14* | (2006.01) |
| *H04L 9/32* | (2006.01) |
| *H04L 29/14* | (2006.01) |
| *H04W 24/04* | (2009.01) |
| *G06Q 20/34* | (2012.01) |
| *H04L 29/06* | (2006.01) |
| *H04W 12/04* | (2009.01) |

(52) U.S. Cl.
CPC ............. *H04L 9/14* (2013.01); *H04L 9/3226* (2013.01); *H04L 9/3234* (2013.01); *H04L 9/3271* (2013.01); *H04L 63/06* (2013.01); *H04L 69/40* (2013.01); *H04W 12/04* (2013.01); *H04W 24/04* (2013.01); *H04L 2209/80* (2013.01)

(58) Field of Classification Search
CPC ....... H04L 9/12; H04L 9/3226; H04L 9/3234; H04L 9/3271; H04L 63/06; H04L 69/40; G06Q 20/3576
USPC .................. 713/168, 182; 370/328; 380/277; 375/261
See application file for complete search history.

(56) References Cited

U.S. PATENT DOCUMENTS

| | | | |
|---|---|---|---|
| 8,589,689 | B2 | 11/2013 | Palanigounder et al. |
| 2005/0025091 | A1 | 2/2005 | Patel |
| 2005/0047597 | A1 | 3/2005 | Zheng |
| 2007/0266260 | A1 | 11/2007 | Kim |
| 2008/0002654 | A1 | 1/2008 | Bolin ........................... 370/339 |
| 2008/0130895 | A1* | 6/2008 | Jueneman ............. H04L 9/3066 380/277 |
| 2011/0091036 | A1 | 4/2011 | Norman |
| 2011/0191842 | A1 | 8/2011 | Lindholm |
| 2011/0269423 | A1 | 11/2011 | Schell et al. |
| 2011/0314522 | A1 | 12/2011 | Palanigounder |
| 2012/0144189 | A1 | 6/2012 | Zhong |
| 2013/0155954 | A1* | 6/2013 | Wang ...................... H04W 4/70 370/328 |
| 2013/0331063 | A1 | 12/2013 | Cormier et al. |
| 2014/0003604 | A1 | 1/2014 | Campagna et al. |
| 2014/0051422 | A1 | 2/2014 | Mittal |
| 2014/0141763 | A1 | 5/2014 | Suh |
| 2016/0316368 | A1 | 10/2016 | Gan |
| 2016/0337786 | A1 | 11/2016 | Kafle |
| 2016/0366127 | A1 | 12/2016 | Tanoni |

FOREIGN PATENT DOCUMENTS

| | | |
|---|---|---|
| CN | 102026178 A | 4/2011 |
| CN | 102083064 A | 6/2011 |
| CN | 102150466 A | 8/2011 |
| CN | 102859966 A | 1/2013 |
| EP | 1209935 A1 | 5/2002 |
| EP | 1613116 A1 | 1/2006 |
| EP | 2723114 A1 | 4/2014 |
| EP | 2731382 A2 | 5/2014 |
| JP | 2010-161733 A | 7/2010 |
| WO | 2010/027314 A1 | 3/2010 |
| WO | WO-2013007865 A1 | 1/2013 |
| WO | WO-2013127190 A1 | 9/2013 |
| WO | 2015/177397 A1 | 11/2015 |

OTHER PUBLICATIONS

"Comments on S3-131066 (attachment), TUAK Algorithm Set, Document 1: Algorithm Specification", 3GPP TSG SA WG3 (Security) Meeting #73, S3-131104, Agenda Item: 7.15, Nokia, Nov. 11-15, 2013, pp. 1-31.
"3rd Generation Partnership Project; Technical Specification Group Core Network and Terminals; Mobility Management Entity (MME)—Visitor Location Register (VLR) SGs interface specification (Release 12)", 3GPP TS 29.118, V12.0.0, Mar. 2013, pp. 1-67.
"3rd Generation Partnership Project; Technical Specification Group Core Network and Terminals; Non-Access-Stratum (NAS) protocol for Evolved Packet System (EPS); Stage 3 (Release 12)", 3GPP TS 24.301, V12.2.0, Sep. 2013, pp. 1-352.
"3rd Generation Partnership Project; Technical Specification Group Core Network and Terminals; Mobile radio interface Layer 3 specification; Core network protocols; Stage 3(Release 12)", 3GPP TS 24.008, V12.3.0, Sep. 2013, pp. 1-683.
"3rd Generation Partnership Project; Technical Specification Group Services and System Aspects; Specification of the TUAK Algorithm Set: A Second Example Algorithm Set for the 3GPP Authentication and Key Generation Functions f1, f1*, f2, f3, f4, f5 and f5*; Document 1: Algorithm Specification (Release 12)", 3GPP TS 35.231, V12.0.1, Dec. 2013, pp. 1-27.
International Search Report and Written Opinion received for corresponding Patent Cooperation Treaty Application No. PCT/FI2014/050381, dated Dec. 15, 2014, 18 pages.
"3rd Generation Partnership Project; Technical Specification Group Core Network and Terminals; Non-Access-Stratum (NAS) protocol for Evolved Packet System (EPS); Stage 3(Release 12)", 3GPP TS 24.301, V12.4.0, Mar. 2014, pp. 1-362.
"3rd Generation Partnership Project; Technical Specification Group Services and System Aspects; 3G Security; Security architecture (Release 12)", 3GPP TS 33.102, V12.0.0, Mar. 2014, pp. 1-76.
Extended European Search Report received for corresponding European Patent Application No. 14892634.8, dated Nov. 3, 2017, 6 pages.
LTE; Evolved Universal Terrestrial Radio Access (E-UTRA) and Evolved Universal Terrestrial Radio Access Network (E-UTRAN); Overall description; Stage 2 (3GPP TS 36.300 version 10.2.0 Release 10), ETSI TS 136 300, V10.2.0, (Jan. 2011), pp. 1-12.
Purkhiabani, Masoumeh, and Ahmad Salahi "Enhanced Authentication and Key Agreement Procedure of Next Generation Evolved Mobile Networks" 2011 IEEE 3rd International Conference on Communication Software and Networks. IEEE, 2011. (Year: 2011).
"Universal Mobile Telecommunications System (UMTS); Security Features", 3GPP Systems and Services TSG, Security WG, Tdoc s3-99004, Source: ETSI SMG10, UMTS 33.22, V.1.0.0, Feb. 2-4, 1999, pp. 1-18.
Specification of the TUAK Algorithm Set: A Second Example Algorithm Set for the 3GPP Authentication and Key Generation Functions F1, F1*, F2, F3, F4, F5 and F5*, ETSI SAGE Specification, Version 1.0, Aug. 17, 2013, pp. 1-27.
Rizzo et al. "ETSI White Paper No. 1 Security for ICT—the Work of ETSI", ETSI, Sixth Edition, Jan. 2014, 83 pages.
Blom et al., "Security in the Evolved Packet System", Ericsson, Oct. 1, 2010, pp. 4-9.
3rd Generation Partnership Project; Technical Specification Group Core Network and Terminals; Mobile Radio Interface Layer 3 Specification; Core Network Protocols; Stage 3 (Release 12), 3GPP TS 24.008, V12.5.0, Mar. 2014, pp. 1-691.

* cited by examiner

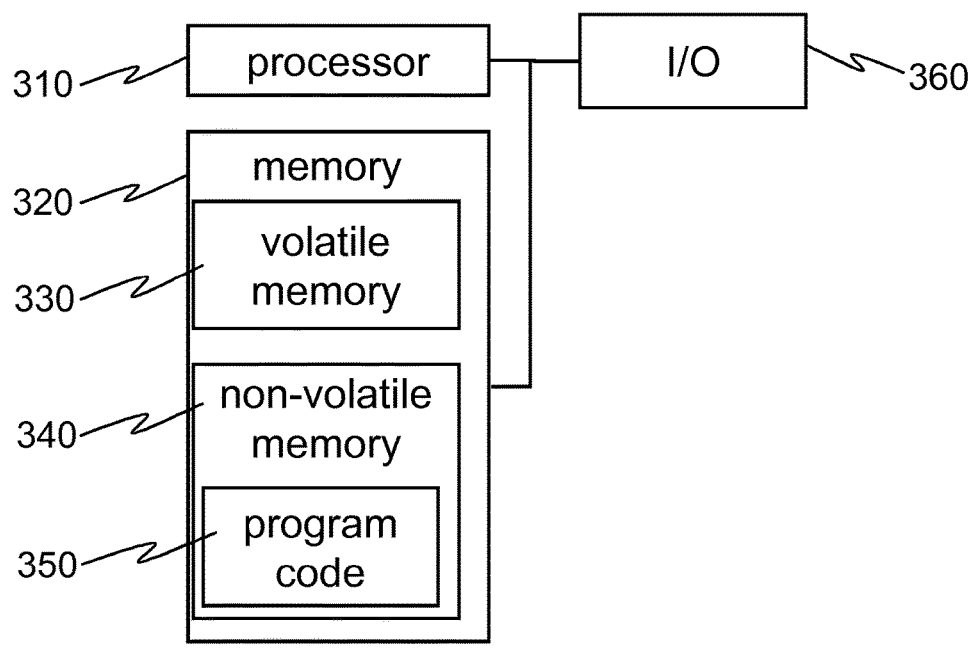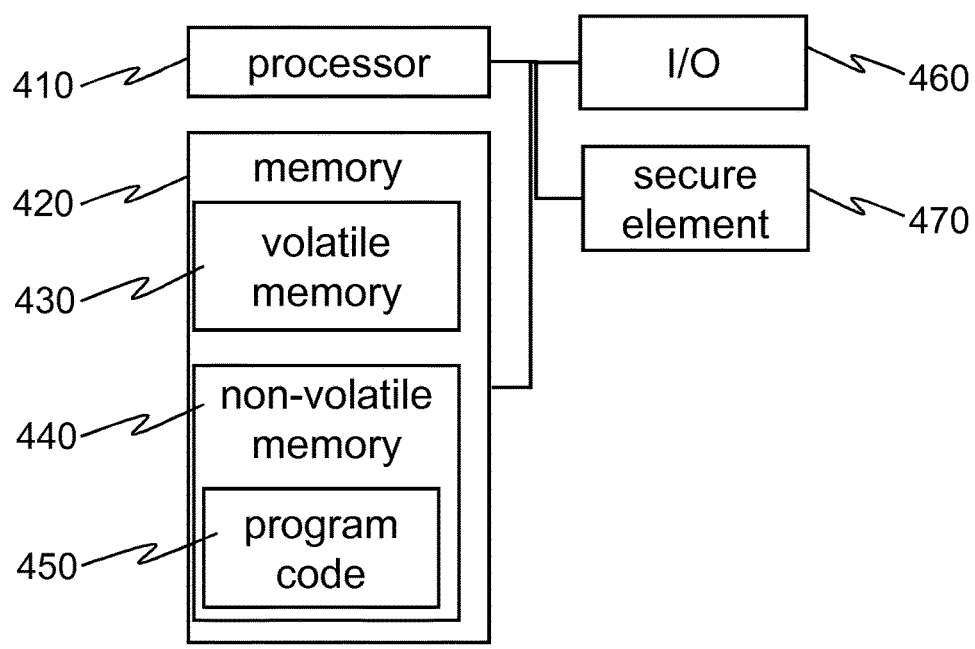

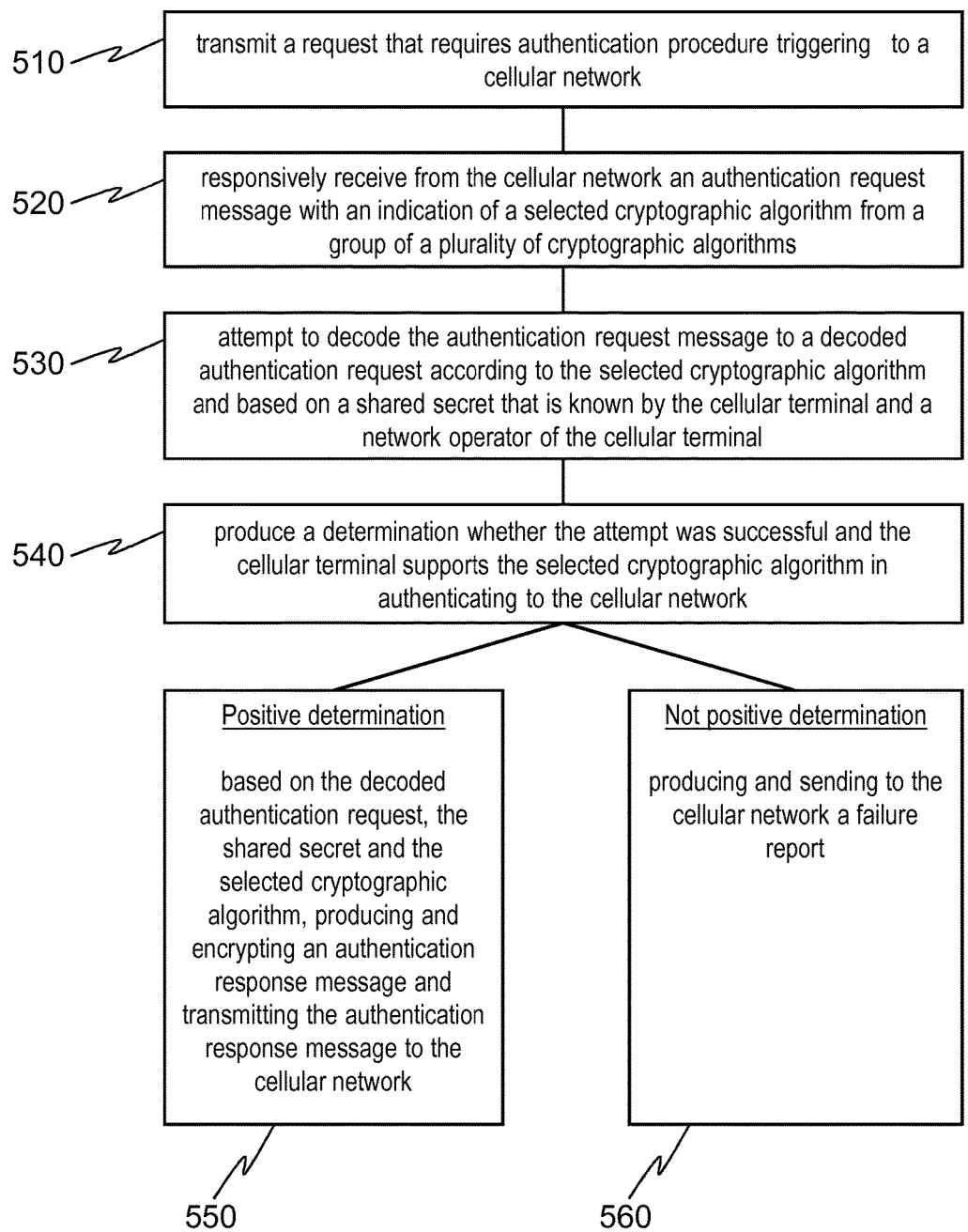

EXCEPTION HANDLING IN CELLULAR AUTHENTICATION

RELATED APPLICATION

This application was originally filed as PCT Application No. PCT/FI2014/050381 filed May 20, 2014.

TECHNICAL FIELD

The present application generally relates to exception handling in cellular authentication.

BACKGROUND

This section illustrates useful background information without admission of any technique described herein representative of the state of the art.

Cellular networks or more accurately cellular telecommunications networks are ubiquitous in modern societies. To enable a cellular terminal to start communications over a cellular network, the cellular terminals need to attach or register to the network in a network registration process. In the network registration process, a cellular terminal exchanges signals to authenticate itself or more accurately its subscription, typically using a USIM application on a UICC. In the network registration process, the cellular terminal obtains from the network and the SIM access information such as a session key with which the cellular terminal can subsequently communicate in the cellular network. The access information typically changes to prevent re-use of the access information by a possible illegal interceptor.

Encryption is a basic tool that is employed also in other types of digital cellular systems. Already GSM used encryption to enable mitigating illegal interception. The development of computer technology has subsequently made old encryption techniques more vulnerable, but also helped to enhance the security techniques used in cellular systems. For instance, wide-band CDMA (W-CDMA) was designed for stronger security by enabling also the network to authenticate itself to the cellular terminals. In the W-CDMA, the subscriber identity is provided by a Universal Integrated Circuit Card (UICC) that runs a Universal Subscriber Identity Module (USIM). The USIM produces e.g. a session key based on a shared secret stored on the UICC, challenge and replay attack prevention codes received from the network and cryptographic algorithm that is enhanced over the one used in GSM. Also the authentication signaling is enhanced in the W-CDMA over GSM e.g. for protection against some man-in-the-middle attacks.

In parallel with the development of security methods for securing the communications in the cellular systems, there are also growing needs for developing the structure of cellular terminals. At present, most cellular terminals contain an identity module slot such as a SIM slot in which a user can place and replace an identity module card such as the UICC. There is also development towards identity modules that are not physically replaceable so as to enable over-the-air change of subscription and/or to prevent theft of the identity module from a cellular terminal. Such software identity modules may be very useful e.g. for built-in vehicular communication systems so that their emergency reporting capabilities and possible burglar control systems could not be easily deactivated by removing an identity module card. While the non-removability of embedded UICCs brings its advantages with respect to theft protection or price, it has also its challenges. One major challenge is the user of the machine that holds the identity module may wish to have another cellular operator. Today, the operator would issue a new card. This is not possible with embedded modules. Therefore, an operator is for the machine use cases not necessarily sure what kind of module will be connected to its network and what capabilities it has. This will lead to error cases that we don't have today and which need to be solved to avoid that the module cannot connect at all.

While necessary for security, the authentication signaling unfortunately delays completion of network registration procedures. Moreover, the inventors have now identified that in some particular combinations of cellular terminal equipment, network configuration and encryption authentication protocols, a cellular terminal might engage into a perpetually failing loop so that its user could not establish telecommunications connectivity at all.

SUMMARY

Various aspects of examples of the invention are set out in the claims.

According to a first example aspect of the present invention, there is provided a method in a cellular terminal, comprising:

transmitting a request that requires authentication procedure triggering to a cellular network and responsively receiving from the cellular network an authentication request message with an indication of a selected cryptographic algorithm from a group of a plurality of cryptographic algorithms;

attempting to decode the authentication request message to a decoded authentication request according to the selected cryptographic algorithm and based on a shared secret known by the cellular terminal and a network operator of the cellular terminal;

producing a determination whether the attempt was successful and the cellular terminal supports the selected cryptographic algorithm in authenticating to the cellular network; and in case the determination is positive, based on the decoded authentication request, the shared secret and the selected cryptographic algorithm, producing and encrypting an authentication response message and transmitting the authentication response message to the cellular network; and in case the determination is not positive, producing and sending to the cellular network a failure report.

The request that requires authentication procedure triggering may be a network registration request.

The request that requires authentication procedure triggering may be a routing area request.

The request that requires authentication procedure triggering may be a tracking area update request.

The authentication request may be an authentication request of an evolved packet system architecture.

The authentication request message may be received from a mobility management entity. The authentication response message may be transmitted to the mobility management entity.

The cellular terminal may comprise a security entity. The security entity may comprise a secure element and a subscriber identity module application. The cellular terminal may comprise user equipment. The user equipment may be configured to perform communications over radio interface with a base station. The security entity may be configured to decode authentication requests and to produce authentication responses. The user equipment may be selected from a group consisting of: a mobile terminal; a laptop computer; a vehicle; a car; a car key; a portable device; a handheld electronic device; and a single or multifunction device with cellular radio capability. The secure element may be removable or embedded or integrated in an existing processor architecture (e.g. baseband circuitry, main processor, central processing unit, and/or master control unit).

The cryptographic algorithms may be selected from a group consisting of MILENAGE; 128 bit TUAK; and 256 bit TUAK. The TUAK may refer to an algorithm set that complies with 3GPP TS 35.231 v. 12.0.1. The TUAK may be configured to employ AES cryptography. The TUAK may be based on Keccak permutation.

The authentication request message may be an extended authentication request message. The extended authentication request may comprise a message type indication that is configured to cause legacy terminals to neglect the extended authentication request message.

The extended authentication request may comprise a field configured to accommodate a 256 bit authentication token, AUTN.

The authentication token may comprise 128 bits, 192 bits, 256 bits or 320 bits. The authentication token may consist of 128 bits, 192 bits, 256 bits or 320 bits. In case that the authentication token is more than 256 bits, excess bits may be discarded.

The authentication token may comprise a sequence number, SQN. The sequence number may consist of 48 bits.

The authentication token may comprise an anonymity key, AK. The anonymity key may consist of 48 bits.

The authentication token may comprise an authentication management field, AMF. The authentication management field may consist of 16 bits. The authentication management field may comprise 7 spare bits. The spare bits may be used to indicate cryptography adaptation information. The cryptography adaptation information may comprise lengths of different cryptography parameters.

The authentication token may comprise a challenge, RAND. The challenge may consist of 128 bits.

The cellular authentication may employ a cipher key, CK. The cipher key may consist of 64 bits, 128 bits or 256 bits.

The cellular authentication may employ an integrity key, IK. The integrity key may consist of 64 bits, 128 bits or 256 bits.

The cellular authentication may employ a response parameter, RES. The response parameter may consist of 32 bits, 64 bits, 128 bits or 256 bits.

The authentication request message may be an updated authentication request. The updated authentication request may comprise an identifier for indicating which cryptographic algorithm is being used for the authentication. The identifier may be a new field in addition to those in the normal authentication request. The normal authentication request may comply with 3GPP TS 24.301 and 3GPP TS 24.008. Alternatively, the identifier may be contained in one or more bits of the authentication management field, AMF.

The authentication request message may comprise a protocol discriminator. The authentication request message may comprise a security header type. The authentication request message may comprise a non-access stratum key set identifier. The authentication request message may comprise a spare half octet. The authentication request message may comprise a challenge, RAND (e.g. evolved packet system, EPS, challenge). The authentication request message may comprise an authentication token, AUTN. The authentication token may comprise an authentication management field, AMF. The authentication management field may comprise a parameter indicating the length of TUAK to be used (e.g. 128 or 256 bit TUAK).

The message type may match with that of the normal authentication request message. The updated authentication request may comprise a 256 bit authentication token field. The updated authentication request may comprise a 256 bit authentication token field only if a 256 bit authentication token is being used. Otherwise, the updated authentication request may comprise a 128 bit authentication token field.

The authentication response message may comprise a message type indication. The message type indication may identify the authentication response message as an extended authentication response message. The message type indication may match with that of a normal authentication response message. The message type indication of the normal authentication response message may comply with 3GPP TS 24.301.

The extended authentication response message may comprise a variable length authentication response parameter, RES. The authentication response parameter may have a length selected from a group consisting of any one or more of: 32 bits, 64 bits, 128 bits or 256 bits.

The authentication response message may be provided with a new information element in comparison the normal authentication response message. The new information element may be configured to accommodate a 128 bit or a 256 bit authentication response parameter.

The authentication response message may comprise an extended authentication response parameter field that is configured to accommodate a 128 bit or a 256 bit authentication response parameter.

The authentication response message may comprise a cryptography algorithm indication.

The failure report may comprise an authentication failure message. The failure report may consist of an authentication failure message. The authentication failure message may comprise any of: a protocol discriminator; a security header type; an authentication failure message type; an EPS mobility management, EMM, cause; and an authentication failure parameter.

The cellular terminal may be configured to detect an error in a message authenticator of the authentication requests, MAC-A. The cellular terminal may be configured to produce the failure report in a manner dependent on the error that was likely to prevent successful decoding of the authentication request or the use of the selected cryptographic algorithm.

The cellular terminal may be configured to contain in the failure report, if the error was caused by incompatible length of MAC-A: an indication of the length of at least one of: the TUAK MAC-A used by the cellular terminal; and the TUAK MAC-A that the cellular terminal derives as likely used by the cellular network in the authentication request.

The failure report may comprise a new information element for error reporting. The error reporting may indicate a new EMM cause code. The error reporting may indicate an existing EMM code such as #20.

The cellular terminal may be configured to detect an error in an authentication management field. The authentication management field may be contained by the MAC-A.

The failure report may indicate any one or more of: the length of TUAK MAC-A used by the cellular terminal; the length of TUAK MAC-A the cellular terminal presumes network used; the length of TUAK integrity key used by the cellular terminal; the length of TUAK integrity key the cellular terminal presumes network used; the length of TUAK cipher key used by the cellular terminal; the length of TUAK cipher key the cellular terminal presumes network used; the length of TUAK authentication value (e.g. RES) used by the cellular terminal; the length of TUAK authentication value (e.g. RES); the cellular terminal presumes network used; the length of TUAK shared secret key used by the cellular terminal; and the length of TUAK shared secret key the cellular terminal presumes network used.

The cellular terminal may be configured to detect an error in a re-synchronization token.

The failure report may contain an indication of the re-synchronization token as computed by the cellular terminal.

The cellular terminal may be configured to detect that the authentication request is configured to request the cellular terminal to use an authentication algorithm that is not supported by the cellular terminal.

The failure report may comprise any one or more of: an indication authentication algorithm or algorithms supported by the cellular terminal; and an indication of authentication algorithm or algorithms requested by the network as determined by the cellular terminal.

According to a second example aspect of the present invention, there is provided a method in a cellular network, comprising:

receiving a request that requires authentication procedure triggering and responsively transmitting an authentication request message with an indication of a selected cryptographic algorithm from a group of a plurality of cryptographic algorithms; and receiving an authentication response message or a failure report indicative of a failure of the cellular terminal to produce an authentication response message corresponding to the authentication request message.

The request that requires authentication procedure triggering may be a network registration request.

The request that requires authentication procedure triggering may be a routing area request.

The request that requires authentication procedure triggering may be a tracking area update request.

The authentication request may be an authentication request of an evolved packet system architecture.

The authentication request message may be transmitted by a mobility management entity. The authentication failure report or the authentication response message may be received by the mobility management entity.

The method may comprise adjusting cellular authentication process with the cellular terminal in response to receiving the failure report. The method may comprise using a recovery mechanism to enable authentication of a cellular terminal that fails to support an authentication process that the cellular terminal should support.

According to a third example aspect of the present invention, there is provided a process comprising the method of the first example aspect and the method of the second example aspect.

According to a fourth example aspect of the present invention, there is provided an apparatus comprising at least one memory and processor that are collectively configured to cause the apparatus to perform the method of the first example aspect.

According to a fifth example aspect of the present invention, there is provided an apparatus comprising at least one memory and processor that are collectively configured to cause the apparatus to perform the method of the second example aspect.

According to a sixth example aspect of the present invention, there is provided an apparatus comprising means for performing the method of the first example aspect.

According to a seventh example aspect of the present invention, there is provided an apparatus comprising means for performing the method of the second example aspect.

According to an eighth example aspect of the present invention, there is provided a system comprising the apparatus of the third or fifth example aspect and the apparatus of the fourth or sixth example embodiment.

According to a ninth example aspect of the present invention, there is provided a computer program comprising computer executable program code configured to execute the method of the first or second example aspect.

The computer program may be stored in a computer readable memory medium.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which:

FIG. 3 shows a block diagram of an apparatus of an example embodiment;

FIG. 4 shows a block diagram of an apparatus of an example embodiment; and

FIG. 5 shows a flow chart illustrating a method in a cellular terminal, according to an example embodiment.

DETAILED DESCRIPTION OF THE DRAWINGS

An example embodiment of the present invention and its potential advantages are understood by referring to FIGS. 1 through 4 of the drawings. In this document, like reference signs denote like parts or steps.

Figure 1:
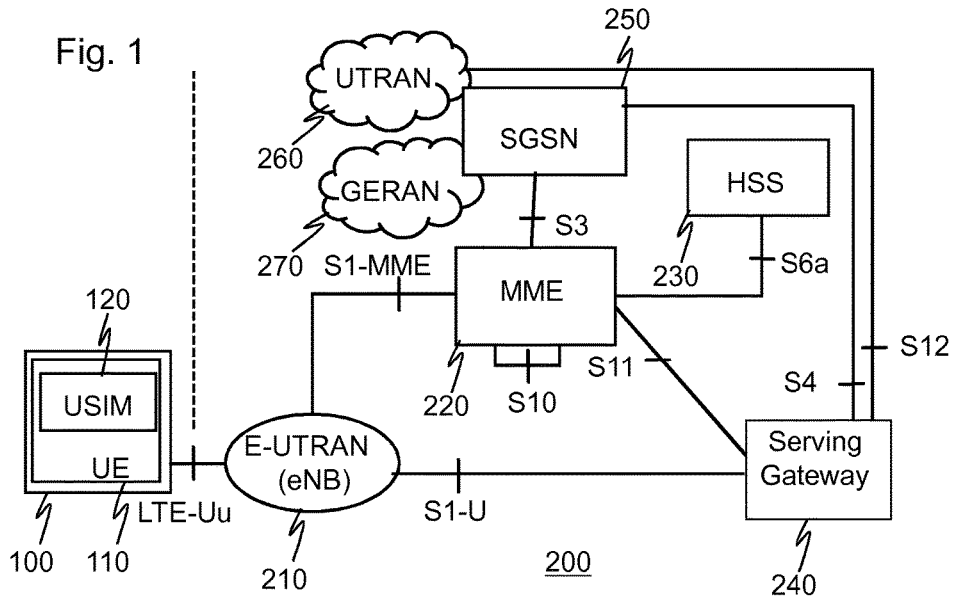
FIG. 1 shows an architectural drawing of a system of an example embodiment.

FIG. 1 an architectural drawing of a system of an example embodiment. A cellular terminal 100 is drawn with user equipment 110 and a secure element containing a USIM 120. In an example embodiment, the USIM is an application on a software implemented security element. The system further comprises a cellular telecommunication network 200 that comprises an E-UTRAN or eNB 210, a mobility management entity MME 220, a home subscriber server, HSS 230 (e.g. home location register HLR, authentication center AuC), a serving gateway 240, a serving gateway support node, SGSN 250, a Universal Terrestrial Radio Access Network, UTRAN 260 and a GSM EDGE Radio Access Network, GERAN 270.

Figure 2:
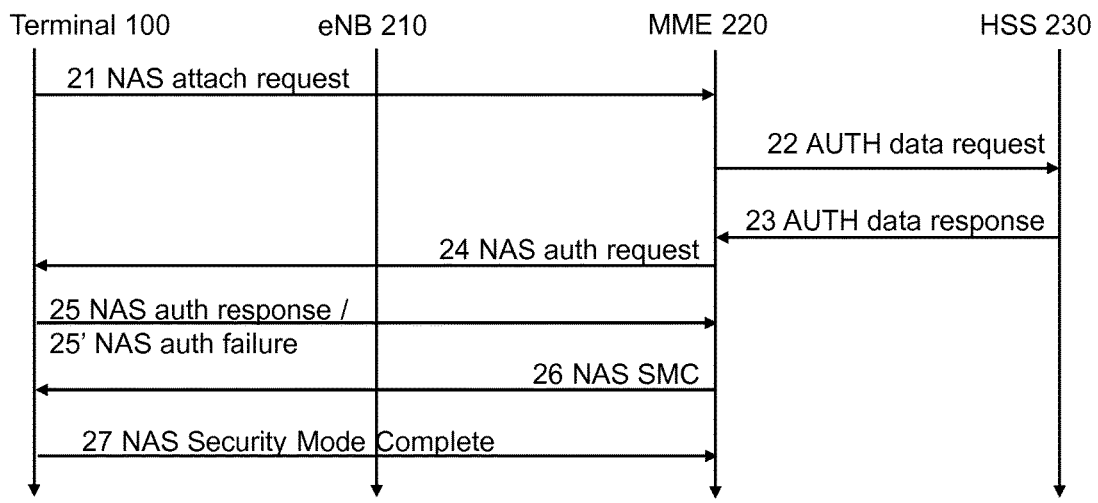
FIG. 2 shows a flow chart of a process of an example embodiment.

FIG. 2 shows a flow chart of a process of an example embodiment. In step 21, the cellular terminal 100 transmits a request that requires authentication procedure triggering to the cellular network 200. For example, the cellular terminal 100 sends a non-access stratum (NAS) attach request or network registration request to the MME 220 via the eNB 210. The MME 220 requests 22 authentication data (e.g. an authentication quintet) from the HSS 230 and responsively receives 23 an authentication data response with the requested authentication data. The MME 220 then responds to the transmitting of the request that requires authentication so that the cellular terminal 100 receives from the cellular network an authentication request message with an indication of a selected cryptographic algorithm from a group of a plurality of cryptographic algorithms. For example, the MME 220 sends 24 an NAS authentication request to the terminal 100 that replies 25 with an NAS authentication response if the terminal 100 is capable of decoding the NAS authentication request and to produce the NAS authentication response.

To this end, the terminal 100 has to support the authentication algorithm used by the MME and possess a shared secret that is known by the HSS 230 and the terminal 100. If the terminal 100 fails to decode the NAS authentication request, the terminal 100 replies 25' with a NAS authentication failure.

In an example embodiment, the cellular terminal decodes the authentication request message to a decoded authentication request according to the selected cryptographic algorithm and based on a shared secret known by the cellular terminal and a network operator of the cellular terminal. Based on the decoded authentication request, the shared secret and the selected cryptographic algorithm, the cellular terminal 100 produces and encrypts an authentication response message in an example embodiment (e.g. for replying in step 25).

After successful decoding of the NAS authentication request and the responsive NAS authentication response, the MME sends 26 to the terminal 100 a NAS security mode completion message and the terminal 100 replies 27 with a corresponding NAS security mode complete message. In another example embodiment, either or both the NAS security mode completion and NAS security mode complete reply is/are omitted or substituted by one or more other signals or messages.

According to an example embodiment, a failure report is produced and sent to the cellular network 200, if the decoding of the authentication request message fails. Failure handling of an example embodiment is further described in the foregoing with reference to FIG. 5.

Various messages of FIG. 2 and their processing can be implemented in a large variety of different ways.

In an example embodiment, the process of FIG. 2 starts from another request that requires authentication procedure triggering such as a tracking area update request or a routing area request to the cellular network 200 instead of the network registration request.

In an example embodiment, the authentication request message 24 comprises an indication of a selected cryptographic algorithm from a group of a plurality of cryptographic algorithms. In an example embodiment, the cryptographic algorithms are selected from a group consisting of MILENAGE; 128 bit TUAK; and 256 bit TUAK. The TUAK may refer to an algorithm set that complies with 3GPP TS 35.231 v. 12.0.1. The TUAK may be configured to employ AES cryptography. The TUAK may be based on Keccak permutation.

In an example embodiment, the selected cryptographic algorithm employs a cipher key, OK. The cipher key may consist of 64, 128 or 256 bits.

In an example embodiment, the selected cryptographic algorithm employs an integrity key, IK. The integrity key may consist of 64, 128 or 256 bits.

In an example embodiment, the selected cryptographic algorithm employs a response parameter, RES. The response parameter may consist of 32, 64, 128 or 256 bits.

In an example embodiment, the authentication request message 24 is an extended authentication request message. In an example embodiment, the extended authentication request comprises a message type indication that is configured to cause legacy terminals to neglect the extended authentication request message.

In an example embodiment, the extended authentication request comprises a field configured to accommodate a 256 bit authentication token, AUTN.

In an example embodiment, the authentication request message 24 is an updated authentication request. In an example embodiment, the updated authentication request comprises an identifier for indicating which cryptographic algorithm is being used for the authentication. In an example embodiment, the identifier is a new field in addition to those in the normal authentication request. In an example embodiment, the normal authentication request complies with 3GPP TS 24.301 or 3GPP TS 24.008. In an example embodiment, the identifier is contained in one or more bits of the authentication management field, AMF.

In an example embodiment, the authentication request message 24 comprises a protocol discriminator. In an example embodiment, the authentication request message comprises a security header type. In an example embodiment, the authentication request message comprises a non-access stratum key set identifier. In an example embodiment, the authentication request message comprises a spare half octet. In an example embodiment, the authentication request message comprises a challenge, RAND (e.g. evolved packet system, EPS, challenge). In an example embodiment, the authentication request message comprises an authentication token, AUTN. In an example embodiment, the authentication token comprises an authentication management field, AMF. The authentication management field may comprise a parameter indicating the length of TUAK to be used (e.g. 128 bit TUAK or 256 bit TUAK).

In an example embodiment, the message type of the updated authentication request matches with that of the normal authentication request message. In an example embodiment, the updated authentication request comprises a 256 bit authentication token field. The updated authentication request may comprise a 256 bit authentication token field only if a 256 bit authentication token is being used. Otherwise, the updated authentication request may comprise a 128 bit authentication token field.

In an example embodiment, the authentication token comprises 128 bits, 192 bits, 256 bits or 320 bits. In an example embodiment, the authentication token consists of 128 bits, 192 bits, 256 bits or 320 bits. In case that the authentication token is more than 256 bits, excess bits may be discarded.

In an example embodiment, the authentication token comprises a sequence number, SQN. In an example embodiment, the sequence number consists of 48 bits.

In an example embodiment, the authentication token comprises an anonymity key, AK. In an example embodiment, the anonymity key consists of 48 bits.

In an example embodiment, the authentication token comprises an authentication management field, AMF. In an example embodiment, the authentication management field consists of 16 bits. In an example embodiment, the authentication management field comprises 7 spare bits. In an example embodiment, the spare bits are used to indicate cryptography adaptation information. In an example embodiment, the cryptography adaptation information comprises lengths of different cryptography parameters.

In an example embodiment, the authentication token comprises a challenge, RAND. In an example embodiment, the challenge consists of 128 bits.

In an example embodiment, the decoding the authentication request message 24 to a decoded authentication request is performed according to the selected cryptographic algorithm and based on a shared secret known by the cellular terminal and a network operator of the cellular terminal.

In an example embodiment, the process comprises, based on the decoded authentication request, the shared secret and the selected cryptographic algorithm, producing and encrypting the authentication response message 25.

In an example embodiment, the authentication response message 25 comprises a message type indication. In an example embodiment, the message type indication identifies the authentication response message as an extended authentication response message. In an example embodiment, the message type indication matches with that of a normal authentication response message. In an example embodiment, the message type indication of the normal authentication response message complies with 3GPP TS 24.301.

In an example embodiment, the extended authentication response message comprises a variable length authentication response parameter, RES. In an example embodiment, the authentication response parameter has a length selected from a group consisting of any one or more of: 32 bits, 64 bits, 128 bits or 256 bits.

In an example embodiment, the authentication response message 25 is provided with a new information element in comparison the normal authentication response message. In an example embodiment, the new information element is configured to accommodate a 128 bit or a 256 bit authentication response parameter.

In an example embodiment, the authentication response message 25 comprises an extended authentication response parameter field that is configured to accommodate a 128 bit or a 256 bit authentication response parameter.

In an example embodiment, the authentication response message 25 comprises a cryptography algorithm indication.

FIG. 3 shows an example block diagram of an apparatus 300 according to an example embodiment. The apparatus 300 comprises a memory 320 that comprises a volatile memory 330 and a non-volatile memory 340 that is configured to store computer programs or software comprising computer program code 350. The apparatus 300 further comprises at least one processor 310 for controlling the operation of the apparatus 300 using the computer program code 350 and an input/output system 360 for communicating with other entities or apparatuses. Accordingly, the input/output system 360 comprises one or more communication units or modules providing communication interfaces towards other entities and/or apparatuses. In an example embodiment, the processor 310 is configured to run the program code 350 in the volatile memory 330. In an example embodiment, the apparatus 300 is configured to operate as the MME 220.

The processor 310 comprises, for example, any one or more of: a master control unit (MCU); a microprocessor; a digital signal processor (DSP); an application specific integrated circuit (ASIC); a field programmable gate array; and a microcontroller.

FIG. 4 shows an example block diagram of an apparatus 400 according to an example embodiment. The apparatus 400 comprises a memory 420 that comprises a volatile memory 430 and a non-volatile memory 440 that is configured to store computer programs or software comprising computer program code 450. The apparatus 400 further comprises at least one processor 410 for controlling the operation of the apparatus 400 using the computer program code 450. The apparatus 400 further comprises an input/output system 460 for communicating with other entities or apparatuses. Accordingly, the input/output system 460 comprises one or more communication units or modules providing communication interfaces towards other entities and/or apparatuses. The apparatus 400 further comprises a secure element (SE) 470 secure element that contains one or more network access applications such as SIM(s) or USIM(s). In an example embodiment, the SE 470 is an application that is hosted by a secure element which is implemented as software. In another example embodiment, the secure element 470 comprises a universal integrated circuit card, UICC. In an example embodiment, the processor 410 is configured to run the program code 450 in the volatile memory 430. In an example embodiment, the apparatus 400 is configured to operate as the cellular terminal 100.

The processor 410 comprises, for example, any one or more of: a master control unit (MCU); a microprocessor; a digital signal processor (DSP); an application specific integrated circuit (ASIC); a field programmable gate array; and a microcontroller.

FIG. 5 shows a flow chart illustrating a method in a cellular terminal, according to an example embodiment, comprising:

transmitting 510 a request that requires authentication procedure triggering to a cellular network and responsively receiving 520 from the cellular network an authentication request message with an indication of a selected cryptographic algorithm from a group of a plurality of cryptographic algorithms;

attempting to decode 530 the authentication request message to a decoded authentication request according to the selected cryptographic algorithm and based on a shared secret known by the cellular terminal and a network operator of the cellular terminal;

producing a determination 540 whether the attempt was successful and the cellular terminal supports the selected cryptographic algorithm in authenticating to the cellular network; and in case the determination is positive, based on the decoded authentication request, the shared secret and the selected cryptographic algorithm, producing and encrypting an authentication response message and transmitting the authentication response message to the cellular network, 550; and in case the determination is not positive, producing and sending to the cellular network a failure report, 560.

The failure report can be formed in a number of ways and in a variety of different forms. For example, in an example embodiment, the failure report comprises and/or consists of authentication failure message. In an example embodiment, the authentication failure message comprises any of: a protocol discriminator; a security header type; an authentication failure message type; an EPS mobility management, EMM, cause; and an authentication failure parameter.

In an example embodiment, the cellular terminal is configured to detect an error in a message authenticator of the authentication requests, MAC-A. In an example embodiment, the cellular terminal is configured to produce the failure report in a manner dependent on the error that was likely to prevent successful decoding of the authentication request or the use of the selected cryptographic algorithm.

In an example embodiment, the cellular terminal is configured to contain in the failure report, if the error was caused by incompatible length of MAC-A: an indication of the length of at least one of: the TUAK MAC-A used by the cellular terminal; and the TUAK MAC-A that the cellular terminal derives as likely used by the cellular network in the authentication request.

In an example embodiment, the failure report comprises a new information element for error reporting. In an example embodiment, the error reporting indicates a new EMM cause code. In an example embodiment, the error reporting indicates an existing EMM code such as #20.

In an example embodiment, the cellular terminal is configured to detect an error in an authentication management field. In an example embodiment, the authentication management field is contained by the MAC-A.

In an example embodiment, the failure report indicates any one or more of: the length of TUAK MAC-A used by the cellular terminal; the length of TUAK MAC-A the cellular terminal presumes network used; the length of TUAK integrity key used by the cellular terminal; the length of TUAK integrity key the cellular terminal presumes network used; the length of TUAK cipher key used by the cellular terminal; the length of TUAK cipher key the cellular terminal presumes network used; the length of TUAK authentication value (e.g. RES) used by the cellular terminal; the length of TUAK authentication value (e.g. RES); the cellular terminal presumes network used; the length of TUAK shared secret key used by the cellular terminal; and the length of TUAK shared secret key the cellular terminal presumes network used.

In an example embodiment, the cellular terminal is configured to detect an error in a re-synchronization token.

In an example embodiment, the failure report contains an indication of the re-synchronization token as computed by the cellular terminal.

In an example embodiment, the cellular terminal is configured to detect that the authentication request is configured to request the cellular terminal to use an authentication algorithm that is not supported by the cellular terminal.

In an example embodiment, the failure report comprises any one or more of: an indication authentication algorithm or algorithms supported by the cellular terminal; and an indication of authentication algorithm or algorithms requested by the network as determined by the cellular terminal.

Without in any way limiting the scope, interpretation, or application of the claims appearing below, a technical effect of one or more of the example embodiments disclosed herein is that reasons for authentication failures may be identified to the cellular network for suitable action therein. Another technical effect of one or more of the example embodiments disclosed herein is that cellular networks may test different authentication algorithms and/or parameters and learn from failure reports the capabilities of cellular terminals. Another technical effect of one or more of the example embodiments disclosed herein is problems caused for cellular terminals by using two or more different authentication procedures may be identified and addressed by the cellular network.

Embodiments of the present invention may be implemented in software, hardware, application logic or a combination of software, hardware and application logic. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 3 or 4. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. A method in a cellular terminal, comprising:
transmitting a request that requires authentication procedure triggering to a cellular network and responsively receiving from the cellular network an authentication request message with an indication of a selected cryptographic algorithm from a group of a plurality of cryptographic algorithms, wherein the cryptographic algorithms are selected from a group consisting of MILENAGE, 128 bit TUAK, and 256 bit TUAK;
attempting to decode the authentication request message to a decoded authentication request according to the selected cryptographic algorithm and based on a shared secret known by the cellular terminal and a network operator of the cellular terminal;
producing a determination whether the attempt was successful and the cellular terminal supports the selected cryptographic algorithm in authenticating to the cellular network; and
in case the determination is positive, based on the decoded authentication request, the shared secret and the selected cryptographic algorithm, producing and encrypting an authentication response message and transmitting the authentication response message to the cellular network; and
in case the determination is not positive, producing and sending to the cellular network a failure report.

2. The method of claim 1, wherein the request that requires authentication procedure triggering is selected from a group consisting of: a network registration request; a routing area request; and a tracking area update request.

3. The method of claim 1, wherein the authentication request is an authentication request of an evolved packet system architecture.

4. The method of claim 1, wherein the authentication request message is received from a mobility management entity.

5. The method of claim 1, wherein the authentication response message is transmitted to the mobility management entity.

6. The method of claim 1, wherein the cellular terminal comprises a security entity that comprises a secure element and a subscriber identity module application.

7. The method of claim 6, wherein the security entity is configured to decode authentication requests and to produce authentication responses.

8. The method of claim 1, wherein the failure report comprises an authentication failure message.

9. The method of claim 1, wherein the authentication failure message comprises any of: a protocol discriminator; a security header type; an authentication failure message type; an evolved packet system mobility management cause; and an authentication failure parameter.

10. The method of claim 1, wherein the cellular terminal is configured to produce the failure report in a manner dependent on the error that was likely to prevent successful decoding of the authentication request or the use of the selected cryptographic algorithm.

11. The method of claim 1, wherein the cellular terminal is configured to detect an error in a message authenticator of the authentication requests.

12. The method of claim 1, wherein the failure report comprises a new information element for error reporting.

13. The method of claim 1, wherein the cellular terminal is configured to detect an error in an authentication management field, where the authentication management field is contained by a message authenticator of the authentication requests.

14. A method in a cellular terminal, comprising:
transmitting a request that requires authentication procedure triggering to a cellular network and responsively receiving from the cellular network an authentication request message with an indication of a selected cryptographic algorithm from a group of a plurality of cryptographic algorithms, wherein the cellular terminal is configured to detect an error in a message authenticator of the authentication requests;
attempting to decode the authentication request message to a decoded authentication request according to the selected cryptographic algorithm and based on a shared secret known by the cellular terminal and a network operator of the cellular terminal;
producing a determination whether the attempt was successful and the cellular terminal supports the selected cryptographic algorithm in authenticating to the cellular network; and
in case the determination is positive, based on the decoded authentication request, the shared secret and the selected cryptographic algorithm, producing and encrypting an authentication response message and transmitting the authentication response message to the cellular network; and
in case the determination is not positive, producing and sending to the cellular network a failure report, wherein the cellular terminal is configured to contain in the failure report, if the error was caused by incompatible length of the message authenticator of the authentication requests:
an indication of the length of at least one of:
a TUAK message authenticator of the authentication requests used by the cellular terminal; or
a TUAK message authenticator of the authentication requests that the cellular terminal derives as likely used by the cellular network in the authentication request.

15. A method in a cellular terminal, comprising:
transmitting a request that requires authentication procedure triggering to a cellular network and responsively receiving from the cellular network an authentication request message with an indication of a selected cryptographic algorithm from a group of a plurality of cryptographic algorithms, wherein the cellular terminal is configured to detect an error in an authentication management field, where the authentication management field is contained by a message authenticator of the authentication requests;
attempting to decode the authentication request message to a decoded authentication request according to the selected cryptographic algorithm and based on a shared secret known by the cellular terminal and a network operator of the cellular terminal;
producing a determination whether the attempt was successful and the cellular terminal supports the selected cryptographic algorithm in authenticating to the cellular network; and
in case the determination is positive, based on the decoded authentication request, the shared secret and the selected cryptographic algorithm, producing and encrypting an authentication response message and transmitting the authentication response message to the cellular network; and
in case the determination is not positive, producing and sending to the cellular network a failure report, wherein the failure report indicates any one or more of:
a length of TUAK message authenticator of the authentication requests used by the cellular terminal;
a length of TUAK message authenticator of the authentication requests the cellular terminal presumes network used;
a length of TUAK integrity key used by the cellular terminal;
a length of TUAK integrity key the cellular terminal presumes network used;
a length of TUAK cipher key used by the cellular terminal;
a length of TUAK cipher key the cellular terminal presumes network used;
a length of TUAK authentication value used by the cellular terminal;
a length of TUAK authentication value the cellular terminal presumes network used;
a length of TUAK shared secret key used by the cellular terminal; and/or
a length of TUAK shared secret key the cellular terminal presumes network used.

16. A method in a cellular terminal, wherein the cellular terminal is configured to detect an error in a re-synchronization token, comprising:
transmitting a request that requires authentication procedure triggering to a cellular network and responsively receiving from the cellular network an authentication request message with an indication of a selected cryptographic algorithm from a group of a plurality of cryptographic algorithms;

attempting to decode the authentication request message to a decoded authentication request according to the selected cryptographic algorithm and based on a shared secret known by the cellular terminal and a network operator of the cellular terminal;

producing a determination whether the attempt was successful and the cellular terminal supports the selected cryptographic algorithm in authenticating to the cellular network; and in case the determination is positive, based on the decoded authentication request, the shared secret and the selected cryptographic algorithm, producing and encrypting an authentication response message and transmitting the authentication response message to the cellular network; and in case the determination is not positive, producing and sending to the cellular network a failure report.

17. The method of claim 16, wherein the failure report contains an indication of the resynchronization token as computed by the cellular terminal.

18. An apparatus comprising:

at least one non-transitory memory and at least one processor that are collectively configured to cause the apparatus to perform:

transmitting a request that requires authentication procedure triggering to a cellular network and responsively receiving from the cellular network an authentication request message with an indication of a selected cryptographic algorithm from a group of a plurality of cryptographic algorithms, wherein the cryptographic algorithms are selected from a group consisting of MILENAGE, 128 bit TUAK, and 256 bit TUAK;

attempting to decode the authentication request message to a decoded authentication request according to the selected cryptographic algorithm and based on a shared secret known by the cellular terminal and a network operator of the cellular terminal;

producing a determination whether the attempt, was successful and the cellular terminal supports the selected cryptographic algorithm in authenticating to the cellular network; and in case the determination is positive, based on the decoded authentication request, the shared secret and the selected cryptographic algorithm, producing and encrypting an authentication response message and transmitting the authentication response message to the cellular network; and in case the determination is not positive, producing and sending to the cellular network a failure report.

\* \* \* \* \*